Patented Sept. 1, 1953

2,650,924

UNITED STATES PATENT OFFICE 2,650,924

DISUBSTITUTED DERIVATIVES OF 2-THIO-6-AMINO-1,2,3,4-TETRAHYDRO-2,4-PYRIMIDINEDIONES

Viktor Papesch, Morton Grove, Ill., assignor to G. D. Searle & Co., Chicago, Ill., a corporation of Illinois No Drawing. Application December 6, 1951, Serial No. 260,339

10 Claims. (Cl. 260—256.5)

The present invention relates to a new group of heterocyclic compounds and, particularly, to disubstituted derivatives of 2-thio-6-amino-1,2,3,4-tetrahydro-2,4-pyrimidinediones which can be represented by the following structural formula

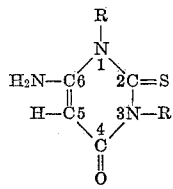

wherein one of the R radicals represents a lower alkenyl radical and the other radical is a member of the class consisting of lower alkyl, alkenyl, aralkyl and aryl radicals.

In the foregoing structural formula one of the R radicals represents an unsaturated hydrocarbon radical of the alkylene series such as vinyl, 2-propenyl, 2-butenyl, 3-butenyl, pentenyl and hexenyl, as well as alkyl substituted derivatives thereof such as methallyl, ethylallyl, methylcrotyl, methylpentenyl and the like. The other R radical can be a lower alkyl radical such as methyl, ethyl, straight or branch-chained propyl, butyl, amyl and hexyl; a lower alkenyl radical of the type above; an aralkyl radical such as benzyl, phenethyl or phenylpropyl; and a lower aryl radical such as phenyl, tolyl and the like.

In a previous application of applicant and of Dr. Elmer F. Schroeder, Serial No. 141,836, filed February 1, 1950, a series of 1,3-dialkyl-2-thio-6 - amino - 1,2,3,4 - tetrahydro - 2,4 - pyrimidinediones was described which has shown valuable therapeutic properties and, particularly, a potent diuretic action. I have now found that other valuable compounds can be produced by introduction of an alkenyl radical into the 1 or 3 position. The compounds which constitute this invention thus are valuable because of their medicinal activity as diuretics. But they are also of value as intermediates in the synthesis of 1,3-disubstituted 2-thioxanthines. In this process the disubstituted compounds described herein are nitrosated to form the corresponding 5-nitroso derivatives. These nitroso derivatives, which are usually of green or brown color, are reduced with an agent such as ammonium sulfide to the corresponding 5,6-diamino-2-thio-1,2,3,4-tetrahydro-2,4-pyrimidinediones. The latter are heated with formic acid to prepare the 5-formylamino derivatives which are then cyclized by heating for a short time with alkali to form the 1-alkyl-3-alkenyl-2-thioxanthines and 1-alkenyl-3-alkyl-2-thioxanthines.

The preferred method for obtaining certain of the compounds of this invention consists in the reaction of an N-alkenyl-N'-alkylthiourea with acetic anhydride and cyanoacetic acid at a temperature of 30-60° C., but preferably 40-55° C., for 5 to 20 minutes, whereby a mixture of the N-cyanoacetyl-N-alkyl-N'-alkenylthiourea and N - cyanoacetyl - N - alkenyl - N' - allylthiourea is formed. This mixture is then cyclized by treatment with alkali at a moderate temperature, preferably about 60° C., for a few minutes. From such a mixture the isomers can be separated by fractional crystalization. However, since both isomers have usually shown a comparable degree of therapeutic activity, use of the mixture of both isomers is usually preferred. It has been found that in the mixture produced by this process the predominating isomer will be the one in which the radical in the 1-position is larger than the one in the 3-position.

This method is also applicable to the preparation of 1,3-dialkenyl-2-thio-6-amino-1,2,3,4-tetrahydro-2,4-pyrimidinediones. Where is is necessary to prepare the pure 1-alkenyl-3-alkyl isomer, it is preferable to treat the alkenylthiourea with cyanoacetic acid, cyclize the resulting N-alkenyl-N'-cyanoacetylthiourea to form the 1-alkenyl - 2 - thio - 6 - amino - 1,2,3,4 - tetrahydro-2,4-pyrimidinedione and alkylate the latter in the 3-position with an alkylating agent such as an alkyl halide or an alkyl sulfate.

The pure 1-alkyl-3-alkenyl isomer can be prepared by reacting an N-alkenyl cyanoacetamide with an alkyl isocyanate and ring closure of the resulting N-cyanoacetyl-N-alkenyl-N'-alkylurea.

The examples below illustrate further certain of the experimental procedures used. The invention is not to be construed as limited thereby in spirit or in scope. It will be apparent to chemists skilled in the art that many modifications in materials and methods can be made without departing from the invention. In these examples temperatures are indicated in degrees centigrade (°C.), pressures in millimeters of mercury (mm.), and quantities in parts by weight.

*Example 1*

A solution of 464 parts of allylthiourea in 540 parts of acetic anhydride is treated by the gradual addition of 400 parts of cyanoacetic acid and the resulting solution is maintained at 40° C. for 1 hour. 1500 parts of water are added and upon standing the initially oily precipitate crystallizes. Recrystallized from water, using charcoal as a clarifying agent, the N-cyanoacetyl-N'-allylurea is obtained which melts at about 137–139° C.

This thiourea derivative is treated with a sufficient amount of 70% sodium hydroxide solution to bring the pH to 10 and kept at a temperature of 75–80° C. for 2 minutes. After cooling the mixture is rendered weakly acid by addition of dilute hydrochloric acid. The precipitated 1-allyl - 2 - thio-6-amino-1,2,3,4-tetrahydro-2,4-pyrimidinedione is collected on a filter and recrystallized from 50% ethanol, using charcoal as a clarifying agent. The white crystals melt at about 230–232° C.

*Example 2*

To a solution of 57 parts of allylamine in 260 parts of benzene, 87 parts of ethyl isothiocyanate are added in the course of one-half hour with stirring and cooling in an ice bath. The solution is concentrated in vacuo at 60° C. and upon chilling of the residue a white crystalline precipitate forms which melts at about 45–47° C.

100 parts of N-ethyl-N'-allylthiourea are dis- in 108 parts of acetic anhydride and then 66 parts of cyanoacetic acid are added. The mixture is maintained at 50° C. for 30 minutes. Most of the solvent is then distilled off at about 20 mm. pressure and 50° C. 100 parts of water are added to the resulting syrup and the distillation is resumed. The residue consists principally of N-cyanoacetyl-N-ethyl-N'-allylthiourea but also contains a significant amount of N-cyanoacetyl-N-allyl-N'-ethyl-thiourea.

The resulting syrup is treated with an equal volume of 10% sodium hydroxide and then the pH is raised to 10 by addition of 70% sodium hydroxide with stirring, during which time the color changes from a reddish brown to umber and the temperature rises to 85° C. Stirring is continued and when the temperature drops to about 60° C. the mixture begins to coagulate. After cooling the mixture is filtered and the material is collected on a filter and recrystallized twice from 25% ethanol at 70° using charcoal as a clarifying agent. The mixture of 1-allyl-3-ethyl - 2 - thio-6-amino-1,2,3,4-tetrahydro-2,4-pyrimidinedione and 1-ethyl-3-allyl-2-thio-6-amino - 1,2,3,4 - tetrahydro-2,4-pyrimidinedione thus obtained melts at about 149–150° C.

*Example 3*

A solution of 60 parts of n-hexylamine in 150 parts of benzene is treated by gradual addition of 68 parts of crotyl isothiocyanate at 20° C. Upon concentration in vacuo the N-hexyl-N'-crotylthiourea is obtained. It is heated with 60 parts of cyanoacetic acid and 200 parts of acetic anhydride with stirring for 20 minutes at 55° C. after which the solvent is removed by vacuum distillation at about 20 mm. pressure and 60° C. as far as practical. The syrup is diluted with 100 parts of water and vacuum distillation is resumed to yield a syrupy mixture which contains mostly N - crotyl - N-cyanoacetyl-N'-hexylurea and a smaller amount of N-hexyl-N-cyanoacetyl-N'-crotylurea.

This mixture of thioureas is treated with stirring with a sufficient quantity of 20% sodium hydroxide to raise the pH to 10. After heating for 10 minutes at 70° C. the mixture is concentrated to a yellowish syrup which contains a mixture of the 1-hexyl-3-crotyl-2-thio-6-amino-1,2,3,4 - tetrahydro-2,4-pyrimidinedione and a smaller amount of 1-crotyl-3-hexyl-2-thio-6-amino - 1,2,3,4-tetrahydro-2,4-pyrimidinedione. Decolorization is achieved by treatment with charcoal in ethanol.

*Example 4*

33 parts of allyl isothiocyanate are added dropwise with stirring and cooling to a solution of 31 parts of aniline in 100 parts of benzene. Upon concentration in vacuo N-allyl-N'-phenylthiourea is obtained which is dissolved in 100 parts of acetic anhydride and treated with 34 parts of cyanoacetic acid by heating for 90 minutes at 65° C. The reaction mixture is distilled in vacuum at about 20 mm. pressure and 60° C. to yield a crystalline precipitate of a mixture of N-allyl-N-cyanoacetyl-N'-phenylthiourea and N-phenyl-N-cyanoacetyl - N'-allylthiourea. These crystals are treated with 15% sodium hydroxide until the pH has risen to 10 and then heated at 70° C. for 10 minutes. Upon cooling a yellowish crystalline mixture consisting primarily of 1-phenyl-3-allyl-2-thio - 6 - amino-1,2,3,4-tetrahydro-2,4-pyrimidinedione and a small quantity of 1-allyl-3-phenyl-2-thio-6-amino-1,2,3,4 - tetrahydro-2,4-pyrimidinedione is obtained. Clear crystals are produced by repeated recrystallizations from dilute alcohol, using decolorizing charcoal as a clarifying agent.

*Example 5*

40 parts of benzyl isothiocyanate are added dropwise with stirring to a solution of 21 parts of methallylamine in 100 parts of benzene at a temperature below 25° C. Upon evaporation in vacuum the N-methyallyl-N'-benzylthiourea is obtained. 23 parts of this thiourea derivative are dissolved in 45 parts of glacial acetic acid and 45 parts of acetic anhydride and then treated with 11.8 parts of cyanoacetic acid. The reaction is completed by heating for 15 minutes at 55° C. after which the reaction mixture is concentrated by vacuum distillation. After dilution with water vacuum distillation to a syrup is resumed. To the resulting thick syrup consisting mostly of N - benzyl-N'-methallyl-N'-cyanoacetylthiourea and a smaller amount of N-methallyl-N'-benzyl-N'-cyanoacetylthiourea sufficient 10% sodium hydroxide is added to raise the pH to 9.5. The solution becomes spontaneously hot and stirring is continued until precipitation occurs. The yellowish precipitate is collected on a filter and washed repeatedly with water. It is further decolorized by crystallization from 50% ethanol using charcoal as a clarifying agent. In this product the 1-benzyl-3-methallyl-2-thio-6-amino-1,2,3,4-tetrahydro - 2,4 - pyrimidinedione predominates greatly over the 1-methallyl-3-benzyl - 2 - thio - 6-amino-1,2,3,4-tetrahydro-2,4-pyrimidinedione.

*Example 6*

7 parts of N,N'-di-methallylthiourea are dissolved in 15 parts of glacial acetic acid and 15 parts of acetic anhydride. To this solution 40 parts of cyanoacetic acid are added gradually and the condensation is completed by heating for 15 minutes at 65° C. The resulting mixture is concentrated in vacuo at 50° C. and 20 mm. pressure as far as practical and after addition of 10 parts of water distillation is resumed until the N,N'-dimethallyl-N-cyanoacetylthiourea is obtained as a thick reddish syrup. To this syrup a sufficient amount of 10% sodium hydroxide is added with stirring to raise the pH to 10. Spontaneous heating occurs and stirring is continued until crystallization begins. A yellow precipitate is collected on a filter and recrystallized from a large volume of dilute ethanol to yield the 1,3-dimethallyl-2-thio-6-amino-1,2,3,4-tetrahydro-2,4-pyrimidinedione in clear colorless crystals.

Example 7

A solution of 370 parts of 1-allyl-2-thio-6-amino-1,2,3,4-tetrahydro-2,4-pyrimidinedione in 1000 parts of alcohol is stirred rapidly at 50° C. while 320 parts of ethyl iodide are added in the course of 25 minutes. Stirring is continued at 50° C. for 1 hour longer and an alkaline reaction is maintained by occasional additions of small portions of 15% aqueous sodium hydroxide. After cooling and concentration the residue is washed with cold water. The 1-allyl-3-ethyl-2-thio-6-amino-1,2,3,4-tetrahydro-2,4-pyrimidinedione is obtained in pure form by crystallization from dilute ethanol. A mixed melting point sample with the product of Example 2 shows a melting point of about 151–152° C.

Example 8

300 parts of the ethyl acetate of cyanoacetic acid and 150 parts of allylamine are mixed and maintained for 1 hour at 55° C. The mixture is then cooled and the precipitate is filtered, washed with petroleum ether and then with diethyl ether. The resulting N-allylcyanoacetamide, recrystallized from toluene, melts at about 63–66° C. A mixture of 240 parts of this amide and 330 parts of ethyl isothiocyanate in 2000 parts of toluene is heated at reflux temperature for 24 hours with stirring. After cooling and standing the solution is seeded with N-allylcyanoacetamide and the unreacted material caused to precipitate. The filtrate is evaporated at 55° C. in vacuo to a syrup. The resulting N-allyl-N-cyanoacetyl-N'-ethylurea is treated with a sufficient amount of 10% sodium hydroxide to raise the pH to 10. Cyclization occurs spontaneously and is completed by heating at 70° C. for 5 minutes. After cooling the 1-ethyl-3-allyl-2-thio-6-amino-1,2,3,4-tetrahydro-2,4-pyrimidinedione is collected on a filter, washed with cold water, recrystallized from water using charcoal for decolorization and dried. A mixed melting point sample with the product of Example 2 melts at about 143–147° C.

I claim:

1. 2-thio-6-amino-1,2,3,4-tetrahydro-2,4-pyrimidinedione derivatives of the structural formula

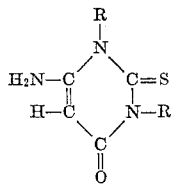

wherein one of the radicals R is a lower alkenyl radical and the other radical R is a hydrocarbon radical containing no more than 8 carbon atoms.

2. An alkenylalkyl-2-thio-6-amino-1,2,3,4-tetrahydro-2,4-pyrimidinedione of the structural formula

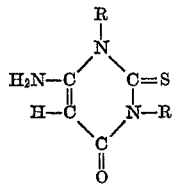

wherein one of the radicals R represents a lower alkenyl radical and the other radical R represents a lower alkyl radical.

3. An allylalkyl-2-thio-6-amino-1,2,3,4-tetrahydro-2,4-pyrimidinedione of the structural formula

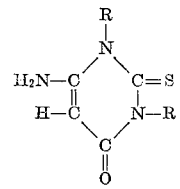

wherein one of the radicals R represents an allyl radical and the other R represents a lower alkyl radical.

4. A 1-allyl-3-alkyl-2-thio-6-amino-1,2,3,4-tetrahydro-2,4-pyrimidinedione of the structural formula

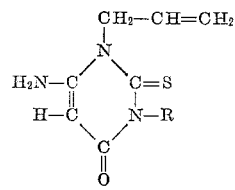

wherein R is a lower alkyl radical.

5. A 1-alkyl-3-allyl-2-thio-6-amino-1,2,3,4-tetrahydro-2,4-pyrimidinedione of the structural formula

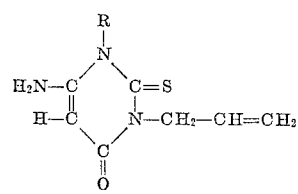

wherein R is a lower alkyl radical.

6. An alkenylaralkyl-2-thio-6-amino-1,2,3,4-tetrahydro-2,4-pyrimidinedione of the structural formula

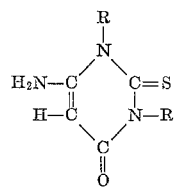

wherein one of the radicals R represents a lower alkenyl radical and the other a lower aralkyl radical.

7. 1-benzyl-3-(lower)alkenyl-2-thio-6-amino-1,2,3,4-tetrahydro-2,4-pyrimidinedione.

8. An allylaryl-2-thio-6-amino-1,2,3,4-tetrahydro-2,4-pyrimidinedione of the structural formula

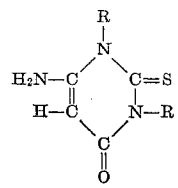

wherein one of the radicals R represents a lower alkenyl radical and the other radical R represents an aryl radical.

9. 1-phenyl-3-(lower)alkenyl-2-thio-6-amino-1,2,3,4-tetrahydro-2,4-pyrimidinedione.

10. A 1,3-di-(lower)alkenyl-2-thio-6-amino-1,2,3,4-tetrahydro-2,4-pyrimidinedione.

VIKTOR PAPESCH.

No references cited.